(12) United States Patent
Yang et al.

(10) Patent No.: US 7,929,277 B2
(45) Date of Patent: Apr. 19, 2011

(54) BATTERY COVER LATCHING MECHANISM

(75) Inventors: Mu-Wen Yang, Taipei Hsien (TW); Chih-Chiang Chang, Taipei Hsien (TW)

(73) Assignee: FIH (Hong Kong) Limited, Kowloon (HK)

( * ) Notice: Subject to any disclaimer, the term of this patent is extended or adjusted under 35 U.S.C. 154(b) by 72 days.

(21) Appl. No.: 12/479,929

(22) Filed: Jun. 8, 2009

(65) Prior Publication Data

US 2010/0165552 A1 Jul. 1, 2010

(30) Foreign Application Priority Data

Dec. 30, 2008 (CN) .......................... 2008 1 0306680

(51) Int. Cl.
*G06F 1/16* (2006.01)
(52) U.S. Cl. .................................. 361/679.01
(58) Field of Classification Search .............. 361/679.01
See application file for complete search history.

(56) References Cited

U.S. PATENT DOCUMENTS

| | | | | |
|---|---|---|---|---|
| 4,391,883 | A * | 7/1983 | Williamson et al. | 429/97 |
| 5,608,612 | A * | 3/1997 | Hokao | 361/814 |
| 5,641,588 | A * | 6/1997 | Sieminski et al. | 429/98 |
| 6,338,914 | B1 * | 1/2002 | Schuurmans | 429/97 |
| 7,081,318 | B2 * | 7/2006 | Lee et al. | 429/97 |
| 7,695,853 | B2 * | 4/2010 | Wells et al. | 429/96 |
| 2003/0152826 | A1 * | 8/2003 | Matsuzawa | 429/100 |
| 2004/0081884 | A1 * | 4/2004 | Bean et al. | 429/98 |
| 2004/0247997 | A1 * | 12/2004 | Lu | 429/97 |
| 2007/0196726 | A1 * | 8/2007 | Nakashima et al. | 429/99 |
| 2008/0063928 | A1 * | 3/2008 | Lin | 429/97 |
| 2008/0311467 | A1 * | 12/2008 | Nishimaki et al. | 429/96 |
| 2010/0086840 | A1 * | 4/2010 | Shao | 429/97 |
| 2010/0119924 | A1 * | 5/2010 | Wang et al. | 429/98 |

* cited by examiner

*Primary Examiner* — Lisa Lea-Edmonds
(74) *Attorney, Agent, or Firm* — Steven M. Reiss

(57) ABSTRACT

A battery cover latching mechanism is provided. The battery cover latching mechanism includes a body member and a cover member. The body member includes a top wall, a bottom wall opposite to the top wall, and a sidewall connecting the top wall and the bottom wall. The top wall and the bottom wall and the sidewall enclose a battery receiving space. The sidewall defines an opening communicating with the battery receiving space. The opening is configured for mounting a battery into the battery receiving space. The cover member is pivotably mounted to the body member to cover the opening.

12 Claims, 5 Drawing Sheets

BATTERY COVER LATCHING MECHANISM

BACKGROUND

1. Technical Field

The present disclosure relates to battery cover latching mechanisms and, particularly, to a battery cover latching mechanism used in a portable electronic device.

2. Description of Related Art

Portable electronic devices e.g., mobile phones and personal digital assistants are becoming widely used. Batteries must be periodically replaced. Thus, many battery cover latching mechanisms have been designed to facilitate the changing of the batteries.

A typical battery cover latching mechanism includes a cover and a housing. One problem is that when opening the cover, such a wide opening is created that it is too easy for dust and moisture to enter the housing and cause damage.

Therefore, there is room for improvement within the art.

BRIEF DESCRIPTION OF THE DRAWINGS

Many aspects of the battery cover latching mechanism can be better understood with reference to the following drawings. These drawings are not necessarily drawn to scale, the emphasis instead being placed upon clearly illustrating the principles of the present battery cover latching mechanism. Moreover, in the drawings like reference numerals designate corresponding sections throughout the several views.

DETAILED DESCRIPTION

Figure 1:
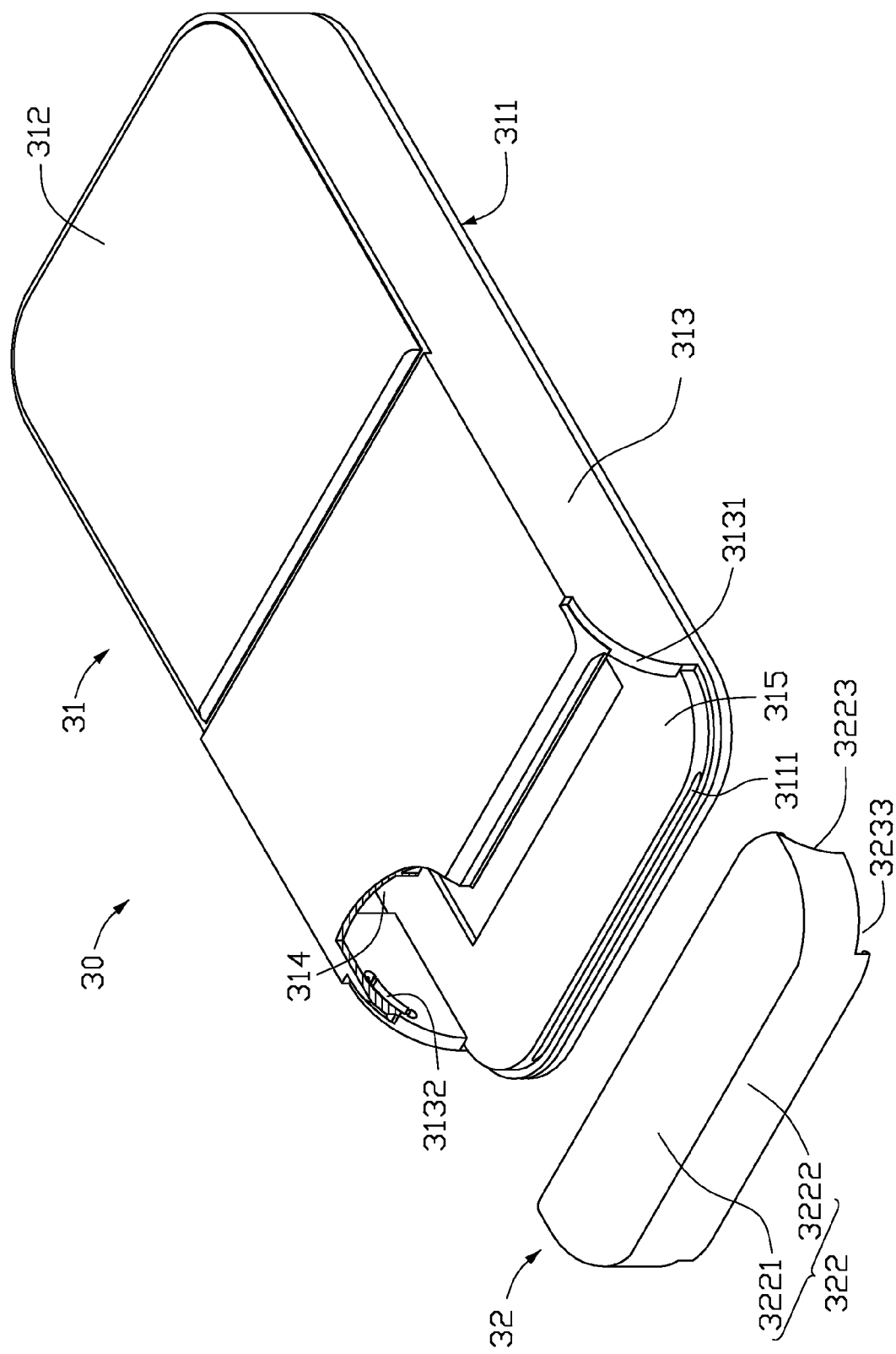
FIG. 1 is an exploded, isometric view of a battery cover latching mechanism, in accordance with an exemplary embodiment.

FIG. 1 shows an exemplary battery cover latching mechanism 30 including a body member 31 and a cover member 32. The cover member 32 is mounted to the body member 31.

Figure 3:
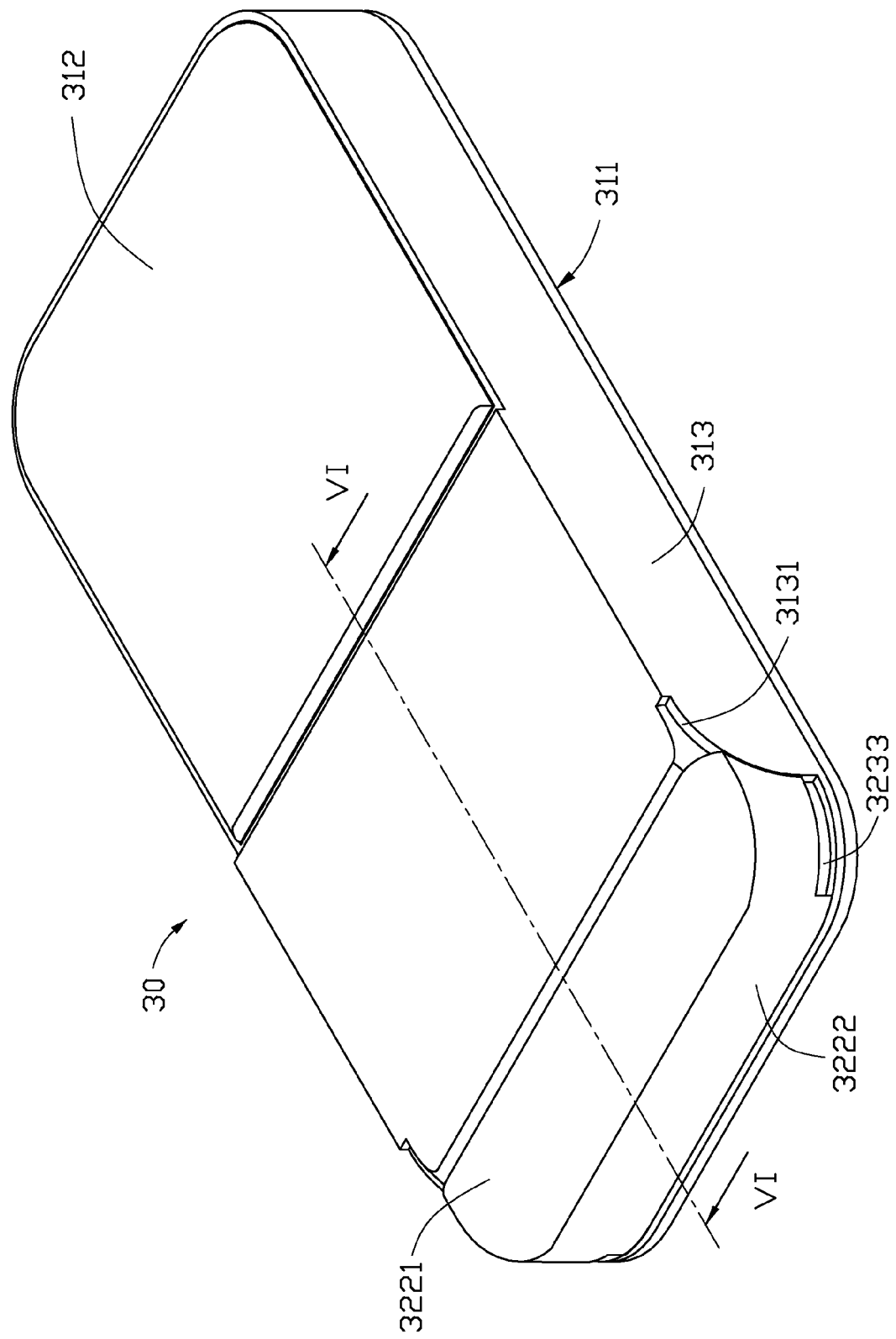
FIG. 3 is an assembled view of the battery cover latching mechanism of FIG. 1.
Figure 4:
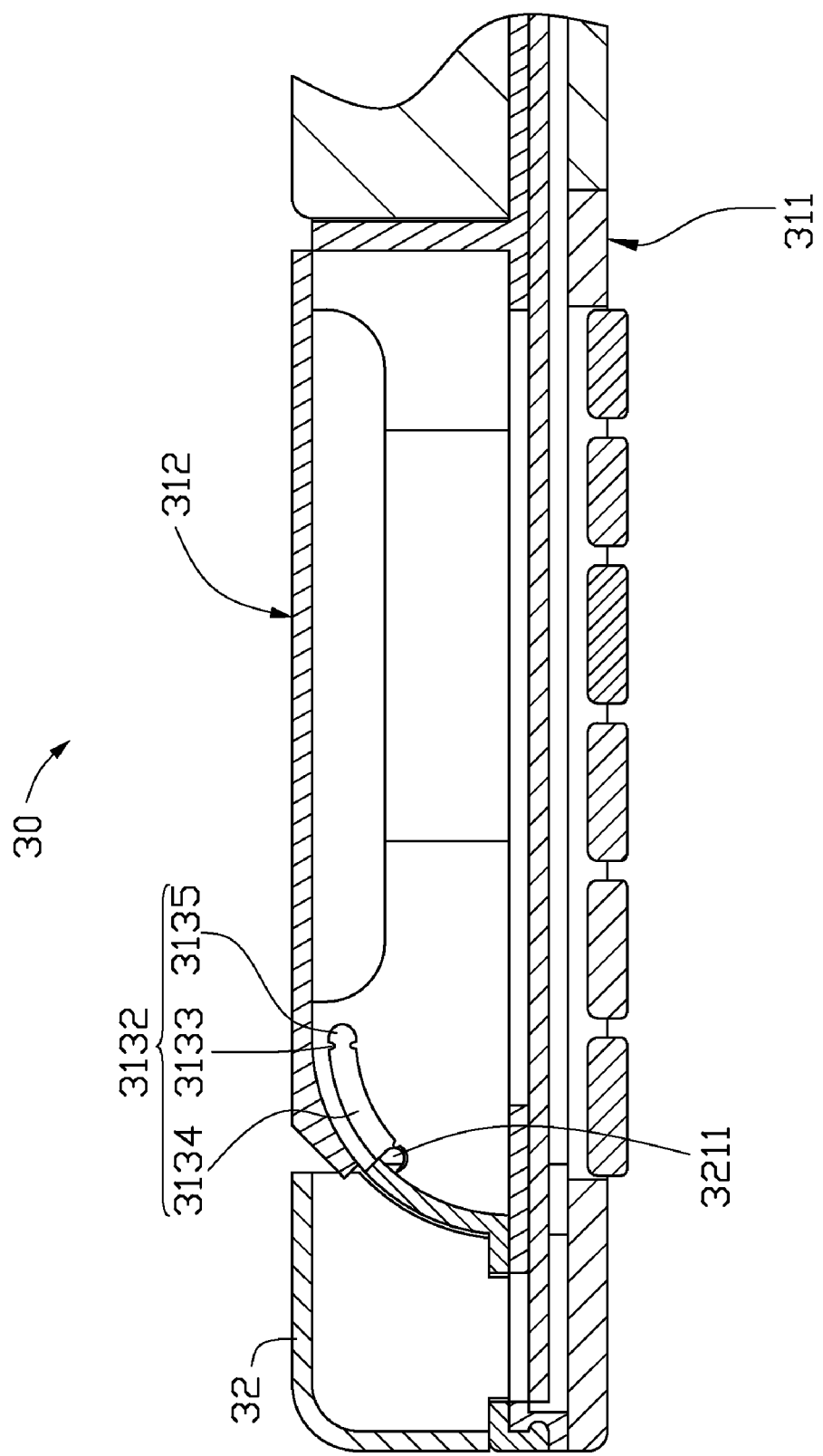
FIG. 4 is a cross-sectional view of the battery cover latching mechanism shown in FIG. 3 taken along line IV-IV.
Figure 5:
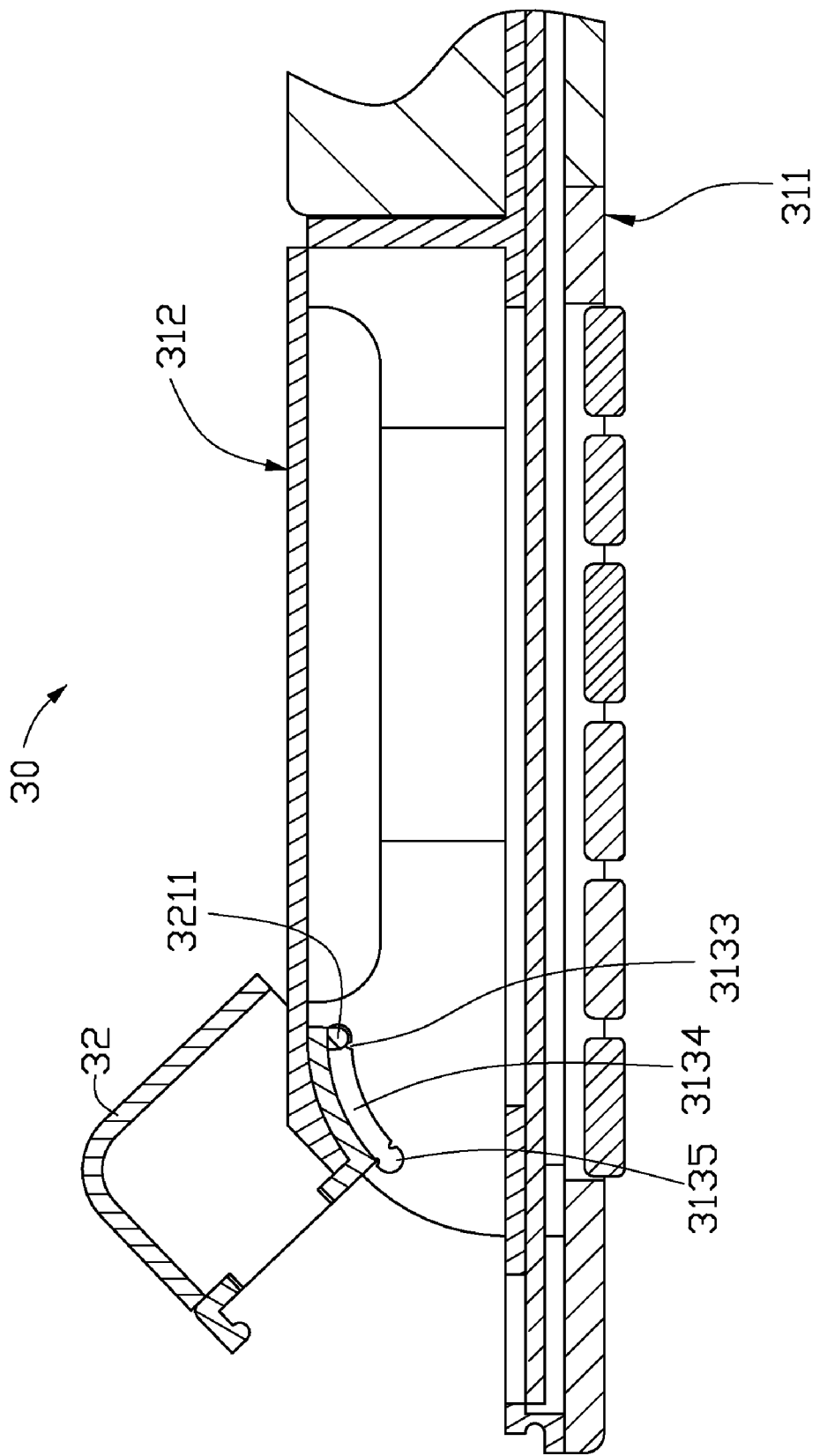
FIG. 5 is a schematic view showing the working of the battery cover latching mechanism shown in FIG. 4.

The body member 31 can be a housing of a portable electronic device. The body member 31 includes a top wall 311, a bottom wall 312 opposite to the top wall 311, and two opposite sidewalls 313. The area of the top wall 311 is generally as big as the bottom wall 312. The area of the sidewall 313 is smaller than the top wall 311 or the bottom wall 312. The two sidewalls 313 connect the top wall 311 and the bottom wall 312 to enclose a battery receiving space 314 and define an opening 315 at one end of the body member 31. The opening 315 is a cutout and communicates with the battery receiving space 314. Each sidewall 313 has an arcuate surface 3131 formed at one distal end thereof and adjacent to the opening 315. An interior surface of each sidewall 313 defines an arcuate sliding slot 3132 along the arcuate surface 3131 (see FIG. 3), forming an interior slot wall. The interior slot wall of each sliding slot 3132 includes two pairs of protrusions 3133. Each pair of protrusions 3133 divide the sliding slot 3132 into a sliding slot section 3134 and two latching slot sections 3135. The sliding slot section 3134 is located between the two latching slot sections 3135. The protrusions 3133 can be deformed due to elasticity. The top wall 311 has a latching slot 3111 defined at an end wall thereof adjacent to the opening 315.

Figure 2:
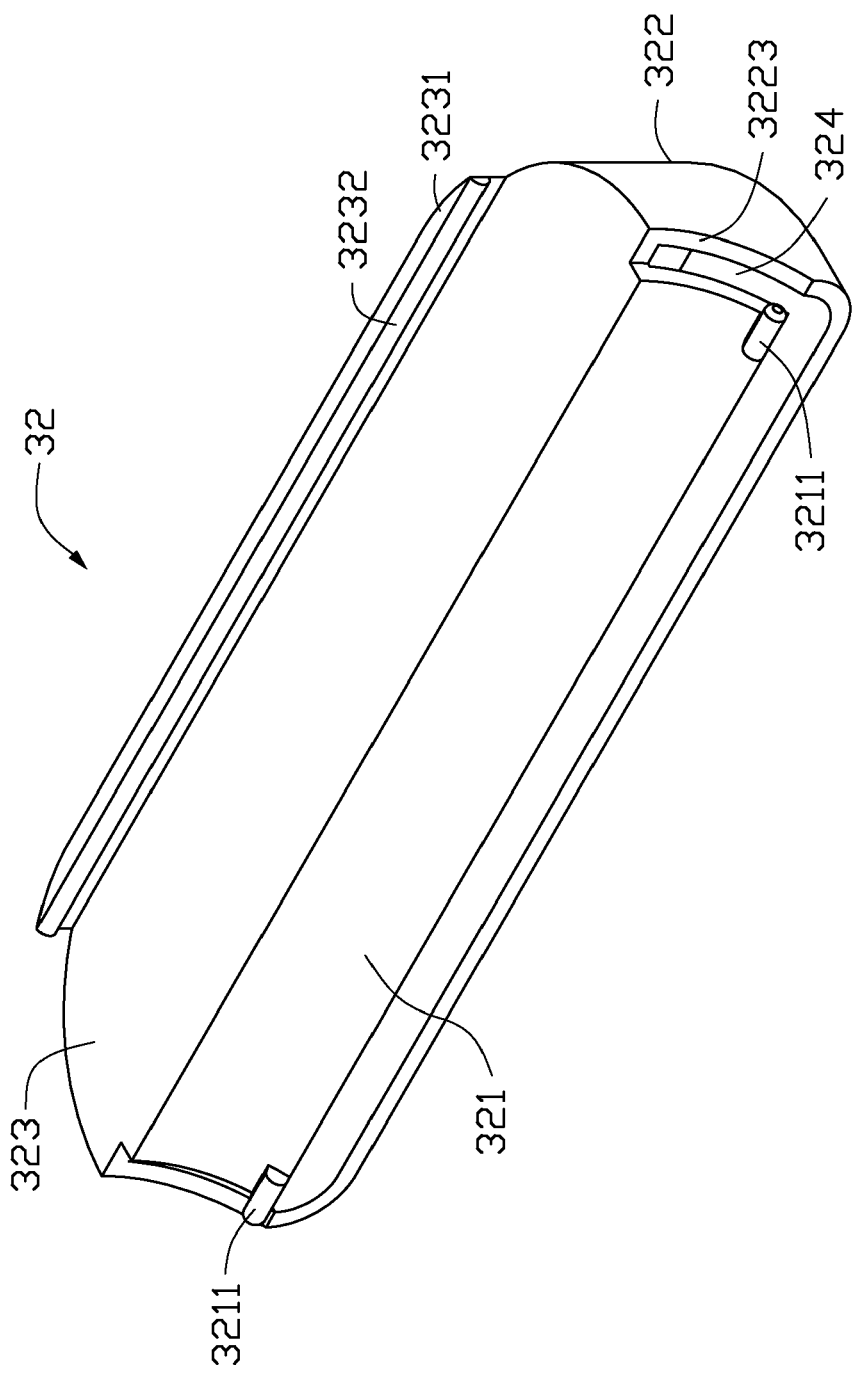
FIG. 2 is an isometric view of the cover member of FIG. 1.

Referring to FIG. 2, the cover member 32 is hollow and configured to cover the opening 315 of the body member 31. The cover member 32 includes a mounting wall 321, a shielding wall 322 and a resisting wall 323. The mounting wall 321, the shielding wall 322, and the resisting wall 323 connect to each other to form a whole. There is a space between the ends of the mounting wall 321 and the two corresponding shielding walls 322, thus defining an aperture 324 between each mounting wall 321 and the shielding wall 322 to avoid any interference between the cover member 32 and the body member 31.

The mounting wall 321 is generally arcuate. The mounting wall 321 includes a semicylinder 3211 disposed at each ends thereof adjacent to the aperture 324. The semicylinders 3211 are partially fixed to the mounting wall 321 away from the resisting wall 323, and partially and perpendicularly extend into the corresponding apertures 324. The semicylinders 3211 are slidably received in the corresponding sliding slot 3132.

The shielding wall 322 includes a first shielding portion 3221 and a second shielding portion 3222 connected to the first shielding portion 3221. The first shielding portion 3221 is connected to the bottom wall 312 and the second shielding portion 3222 is connected to the sidewalls 313, thus covering the opening 315 and combining with the body member 31 as a whole. The second shielding portion 3222 has two symmetric engaging surfaces 3223 corresponding to the arcuate surfaces 3131. The engaging surfaces 3223 are tightly attached to the arcuate surfaces 3131.

The resisting wall 323 faces the top wall 311 of the body member 11 and abuts against an interior surface of the top wall 311 to support the cover 32. The resisting wall 323 includes a latching board 3231 protruding from a straight edge thereof adjacent to the shielding wall 322. The latching board 3231 further includes a latching block 3232 protruding therefrom towards the resisting wall 323 corresponding to the latching slot 3111. The latching block 3232 latches in the latching slot 3111. The latching board 3231 and the resisting wall 323 enclose an operation space 3233 to facilitate operation by users.

To mount the cover member 32 to the body member 31, the mounting wall 321 of the cover member 32 is aligned with the opening 315. The semicylinders 3211 of the cover member 32 are sloped to be inserted into the sliding slots 3132. Then the semicylinders 3211 are adjusted to be perpendicularly and slidably received in the sliding slot section 3134. The cover member 32 is pushed to slide towards the top wall 311 along the sliding slots 3132 until the semicylinders 3211 go over the protrusions 3133 from the sliding slot sections 3134 into the latching slot sections 3135. The cover member 32 is rotated around the semicylinder 3211 until the latching block 3232 deforms to latch into the latching slot 3111. At this time, the opening 315 is completely covered by the cover 32.

To expose the opening 315, the latching block 3232 is deformed to detach from the latching slot 3111. The semicylinders 3211 are pushed to go over the protrusions 3133 from the latching slot sections 3135 into the sliding slot sections 3134. The cover member 32 is further pushed to slide along the sliding slot section 3132 until the semicylinders 3211 go over the other opposite protrusions 3133 from the sliding slot sections 3134 into the other opposite latching slot sections 3135. The cover member 32 is rotated around the semicylinder 3211 until the first shielding wall 3221 of the cover member 32 abuts against the bottom wall 312. At this time, the opening 315 is exposed just enough to replace the battery.

It is to be understood, the opening 315 can be defined on one of the two sidewalls 313.

The battery cover latching mechanism 30 defines the opening 315 on the sidewall 313 with a small size rather than the top wall 311 and the bottom wall 312 with a big size, protecting dust and water from entering into the body member 12 through the opening 315.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of sections within the principles of the disclosure to the full extent indicated by the broad general meaning of the terms, in which the appended claims are expressed.

What is claimed is:

1. A battery cover latching mechanism, comprising:
    a body member defining a battery receiving space and including an opening communicating with the battery receiving space, the opening configured for mounting a battery in the battery receiving space, the body member including a sidewall defining a sliding slot in an interior wall thereof adjacent the opening, two protrusions protruding from the interior wall of the sliding slot near each end of the sliding slot, forming latching slot sections at each end of the sliding slot; and
    a cover member mounted to the body member to cover the opening, one portion of the cover member being a semicylinder protruding therefrom, the semicylinder being rotatably and slidably latched in the sliding slot, and received in the latching slot sections.

2. The battery cover latching mechanism as claimed in claim 1, wherein the sliding slot is arcuate.

3. The battery cover latching mechanism as claimed in claim 1, wherein the sidewall has an attaching surface adjacent to the opening, the cover includes an engaging surface corresponding to the attaching surface, the engaging surface tightly attaches to the attaching surface.

4. The battery cover latching mechanism as claimed in claim 1, wherein the body member includes a top wall, a bottom wall opposite to the top wall, the cover member includes a resisting wall, the resisting wall abuts against the top wall, and is used to support the cover member.

5. The battery cover latching mechanism as claimed in claim 4, wherein the cover member includes a latching block, the top wall defining a latching slot corresponding to the latching block, the latching block latching into the latching slot.

6. The battery cover latching mechanism as claimed in claim 4, wherein the cover member further includes a mounting wall, a resisting wall, and a shielding wall; the mounting wall, the shielding wall and the resisting wall connect each other to form a whole.

7. The battery cover latching mechanism as claimed in claim 6, wherein an aperture is formed between the mounting wall and the shielding wall.

8. A battery cover latching mechanism, comprising:
    a body member including a top wall, a bottom wall opposite to the top wall, and a sidewall connecting the top wall and the bottom wall, the top wall and the bottom wall and the sidewall enclosing a battery receiving space, the sidewall defining an opening communicating with the battery receiving space, the opening configured for mounting a battery in the battery receiving space; and
    a cover member mounted to the body member to cover the opening, the sidewall defining a sliding slot in an interior wall thereof adjacent the opening, the cover member including a semicylinder protruding therefrom, the semicylinder being rotatably and slidably received in the sliding slot.

9. The battery cover latching mechanism as claimed in claim 8, wherein the sliding slot is arcuate.

10. The battery cover latching mechanism as claimed in claim 9, wherein two pairs of protrusions protrude from the interior wall of the sliding slot adjacent to each end of the sliding slot, forming latching slot sections at each end of the sliding slot, the semicylinder being received in the latching slot sections.

11. The battery cover latching mechanism as claimed in claim 9, wherein the sidewall has an attaching surface adjacent to the opening, the cover disposes an engaging surface corresponding to the attaching surface, the engaging surface tightly attaches to the attaching surface.

12. A battery cover latching mechanism, comprising:
    a body member including a top wall, a bottom wall opposite to the top wall, and a sidewall connecting the top wall and the bottom wall, the top wall and the bottom wall and the sidewall enclosing a battery receiving space, the sidewall defining an opening communicating with the battery receiving space, the opening configured for mounting a battery in the battery receiving space; and
    a cover member mounted to the body member to cover the opening, the sidewall defining a sliding slot, a semicylinder protruding from the cover member, the semicylinder being rotatably and slidably received in the sliding slot.

* * * * *